United States Patent
Weston, Jr. et al.

(10) Patent No.: US 11,709,663 B2
(45) Date of Patent: *Jul. 25, 2023

(54) LINK-TIME DRIVER POLYMORPHISM FOR EMBEDDED SYSTEMS

(71) Applicant: Microsoft Technology Licensing, LLC, Redmond, WA (US)

(72) Inventors: Kevin Thomas Weston, Jr., Redmond, WA (US); Ryan James Fairfax, Kirkland, WA (US); Felix Stefan Domke, Schleswig-Holstein (DE); Dylan Keith Garrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,999

(22) Filed: May 18, 2022

(65) Prior Publication Data

US 2022/0276846 A1    Sep. 1, 2022

Related U.S. Application Data

(63) Continuation of application No. 17/102,289, filed on Nov. 23, 2020, now Pat. No. 11,360,753.

(51) Int. Cl.
*G06F 8/41* (2018.01)
*G06N 20/00* (2019.01)
(Continued)

(52) U.S. Cl.
CPC ............... *G06F 8/447* (2013.01); *G06F 8/54* (2013.01); *G06N 20/00* (2019.01); *G06F 9/455* (2013.01)

(58) Field of Classification Search
None
See application file for complete search history.

(56) References Cited

U.S. PATENT DOCUMENTS 5,872,956 A * 2/1999 Beal .......................... G06F 8/70
709/224
7,571,445 B2 * 8/2009 Lin ........................ G06F 9/4411
717/145

(Continued)

OTHER PUBLICATIONS

Peng et al., "Design and Implementation of Portable TPM Device Driver based on Extensible Firmware Interface," IEEE, 2009, 4pg. (Year: 2009).*

(Continued)

*Primary Examiner* — Ryan D. Coyer
(74) *Attorney, Agent, or Firm* — Workman Nydegger

(57) ABSTRACT

Specific images of an OS are built using only the driver bindings that are necessary to link the OS to the particular hardware of a client device. A device tree of the client device is analyzed to identify the hardware components. Databases of different hardware source code for various hardware drivers are maintained and used to craft the driver bindings and instances for the hardware of the client device. The device tree is also analyzed to identify compatibility strings of the various hardware on the client device. The hardware source code is searched for these compatibility strings to see if a driver exists in the databases of hardware source code. Specific driver bindings and driver instances with the actual variable names and configuration parameters of the identified hardware drivers are then generated and included in an image of the OS that may be installed on the client device.

20 Claims, 8 Drawing Sheets

(51) Int. Cl.
*G06F 8/54* (2018.01)
*G06F 9/455* (2018.01)

(56) References Cited

U.S. PATENT DOCUMENTS

| | | | | |
|---|---|---|---|---|
| 8,347,310 B1* | 1/2013 | Vanderspek | ............ | G06F 8/447 |
| | | | | 719/310 |
| 2004/0237062 A1* | 11/2004 | Zeidman | ................ | G06F 9/455 |
| | | | | 719/321 |
| 2015/0058838 A1* | 2/2015 | Tsirkin | ................ | G06F 9/4862 |
| | | | | 718/1 |
| 2017/0010884 A1* | 1/2017 | Liu | ........................ | G06F 8/656 |

OTHER PUBLICATIONS

Weimin et al., "Design and Implementation of UsbKey Device Driver based on Extensible Firmware Interface," IEEE, 2008, 4pg. (Year: 2008).*

* cited by examiner

HW Driver Source Code 222

```
AZSPHERE_CONSTRUCTOR_ARG_DT_SOURCE(UartMt3620, xtal_frequency, "clocks/clock_frequency")
...
public:
    constexpr UartMt3620(const exp23::hal::AddressRange ®, uint32_t xtal_frequency)
        : _reg(reg), _xtal_frequency(xtal_frequency)
```

Device Tree 116

```
m4_uart: uart@21040000 {
    compatible = "mediatek,mt3620-uart";
    reg = <0x21040000 0x400>;
    clocks = <&uart_clk>;
    azsphere,status = "enabled";
};

chosen {
    azsphere,debug-uart = &m4_uart;
};
```

Driver Bindings 124

```
// Device tree path: /uart_clk/clock-frequency
// Followed phandle reference at /soc/uart@21040000/clocks (phandle-2) to /uart_clk
static constexpr uint32_t uart_21040000_xtal_frequency = UINT32_C(26000000);

// Device tree path: /soc/uart@21040000
// Followed reference at /chosen/azsphere,debug-uart to /soc/uart@21040000
static auto uart_21040000 =
    azure_sphere::hal::drivers::UartMt3620(uart_21040000, uart_21040000_xtal_frequency);

static auto api_uart = azure_sphere::hal::api::Uart(uart_21040000);
```

FIG. 4

From Fig. 5A

```
..
.
    "methods": [

{
            "name": "SetBaudrate",          ─── 310n
            "returnType": "void",           ─── 310n
            "voidReturnType": true,
            "parameters": [
                {                           ─── 310o
                    "name": "baudrate",     ─── 310p
                    "type": "uint32_t",
                    "canonicalType": "unsigned int",
                    "arrayType": false      ─── 310q
                }
            ]
        },
..
    "constructors": [
        {
                                            310r
            "parameters": [           ─── 310s      310t
                {
                    "name": "reg",
                    "type": "const exp23: :hal: :AddressRange &",
                    "canonicalType": "const exp23: :hal: :AddressRange &",
                    "arrayType": false
                },
                {                           ─── 310u
                    "name": "xtal_frequency",
                    "type": "uint32_t",     ─── 310v
                    "canonicalType": "unsigned int",
                    "arrayType": false
                }                           ─── 310w
            ]
        ]
    },
```

FIG. 5B

LINK-TIME DRIVER POLYMORPHISM FOR EMBEDDED SYSTEMS

CROSS-REFERENCE TO RELATED APPLICATION

This application is a continuation application of and claims priority to U.S. patent application Ser. No. 17/102,289, entitled "LINK-TIME DRIVER POLYMORPHISM FOR EMBEDDED SYSTEMS," filed on Nov. 23, 2020, the disclosure of which is incorporated herein by reference in its entirety.

BACKGROUND

Operating systems (OSes) control virtually all of today's networked devices. Everything from personal computers to virtual reality (VR) headsets to Internet of Things (IoT) devices rely an OS to provide a software environment in which application-specific code may be deployed. Yet, devices in the area of embedded systems typically run on a controller or processing chip with a limited amount of memory. With memory and processing resources constrained, the OSes running on embedded systems must be efficient.

Modern OSes must function on numerous disparate devices. Consequently, an OS build is configured to operate devices with various different hardware, such as serial ports, displays, network interfaces, and numerous other components. For example, a laptop will have different hardware than a VR headset or an IoT device. Different hardware components use different drivers. So an OS must be able to support different drivers for different hardware components to be able to across a collection of devices.

Device drivers for a particular client device are traditionally identified by the OS at run time, compile time, or link time. Integrating an OS with client drivers at run-time solutions are flash-, memory-, and instruction-inefficient as extra logic is used to select and configure the appropriate drivers. There are also typically pointer dereferences involved in each driver operation, which may be unnoticeable on personal computers but are impact embedded systems due to processing and memory constraints. Integrating an OS with client drivers at compile time pollutes the hardware-agnostic code of the OS with many hardware-specific references and requires quite a bit of rebuilding for each hardware target. This dramatically reduces OS developer productivity. Integrating an OS with client drivers at link time is a bit more efficient but requires an OS developer to already know the specific device drivers of an intended client device as well as the specific code names and configurations of those device drivers. This is very time-intensive for the developer and requires precision to make sure the correct names of the driver are instantiated and used for linking to the client device. These three ways of integrating OS builds to the hardware of client devices require either a substantial amount of additional code in the OS (which require additional memory and processing) or a knowledge of device drivers beforehand by the developer. The latter becomes untenable as the variety of client devices targeted by the OS increases.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to automatically building an image of an OS for a specific client device, with the particular driver bindings and driver instances needed to link the OS to the particular hardware of the client device. To do so, a device tree of the client device is analyzed to identify the hardware components of the client device. Databases of different hardware source code for various hardware drivers are maintained and used to generate the driver bindings and instances for the hardware of the client device. To do so, the device tree is also analyzed to identify compatibility strings of the various hardware on the client device. The hardware source code is searched for these compatibility strings to see if a driver exists in the databases of hardware source code. If so, the driver is analyzed (e.g., when it is inserted into the database) and used to generate specific driver bindings and driver instances with the actual variable names and configuration parameters of the identified hardware drivers. These driver bindings are included in an image of the OS, which may be transmitted to the client device and installed thereon. This ensures that only the hardware drivers needed for the actual hardware on the client device are included in the image of the OS, and that calls between the OS and driver can be optimized (by the compiler and linker during the OS build).

BRIEF DESCRIPTION OF THE DRAWINGS

The disclosed examples are described in detail below with reference to the accompanying drawing figures listed below:

FIG. 4 illustrates UI diagrams of a driver instance being generated from hardware source code and a device tree of a client device, according to some of the disclosed embodiments;

FIGS. 5A-5B illustrates a UI diagram of a driver model, according to some of the disclosed embodiments;

DETAILED DESCRIPTION

Figure 1:
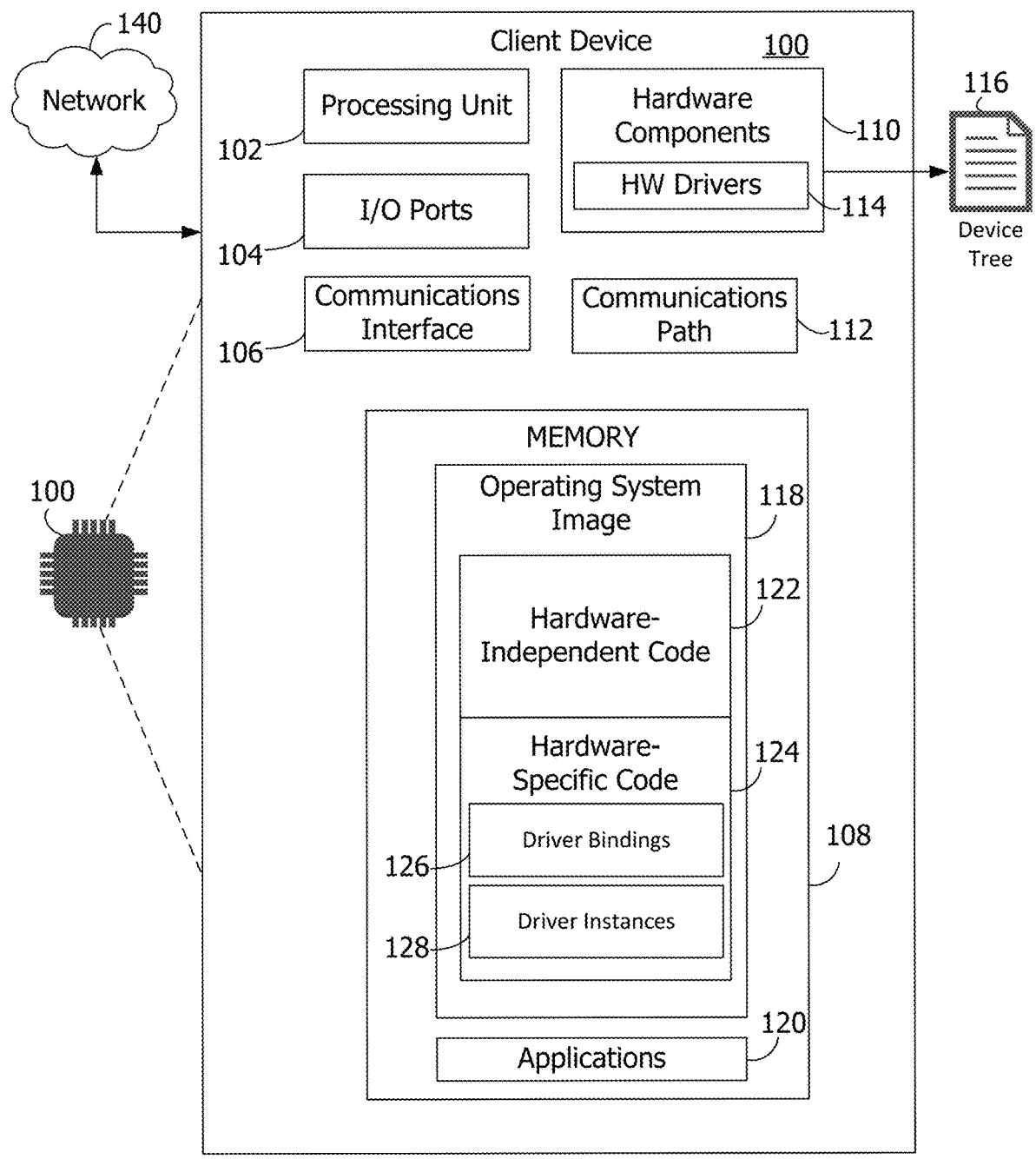
FIG. 1 illustrates an example of a client device configured to receive an OS build with hardware bindings and instances for resident hardware components in accordance with some of the embodiments disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The majority of the code in an OS is hardware independent. Developers want to the write most of the OS code once so that it may perform the same way on multiple devices. But these different end devices have different hardware configurations. So there are portions of an OS that that need to be hardware specific. The OS has to link some of its operations to the specific hardware of an end device, which typically involves finding the correct device drivers and then integrating these device drivers with the hardware-independent portions of the OS code.

The disclosed embodiments and examples provide systems, methods, and executable instructions for machine learning the drivers of a client device and automatically instantiating the correct driver bindings for that hardware in a build of the OS for the client device. In some embodiments, the OS code is compiled into an OS compiled object that includes both hardware-independent portions and hardware-specific portions. The hardware-specific portions have various internal and external interfaces that are to be linked with the different hardware of a client device. The disclosed embodiments automatically identify the particular hardware drivers of a given client device from a device tree and create driver bindings for the uncovered hardware drivers of the client device. These driver bindings are instantiated in the OS source code, providing an effective linking of the various OS external and internal interfaces to the specific hardware of the client device. As a result, an image of the OS with the specific linked device drivers for the specific hardware on the client device is created, allowing the client to download a substantially smaller OS build that does not require as much memory to store and run.

Traditionally, the OS source code calls a well-known function name but that function is not provided by the OS so the OS compiled object will not contain a symbol with that name. The disclosed binding generator creates a function with that well-known name that invokes the corresponding function on the driver instance. The hardware-specific compiled object then contains the well-known symbol name. The linker can then make the connection between the two compiled objects when producing the OS image.

In some embodiments, the disclosed embodiments locate and link hardware-specific drivers for the particular hardware of a client device to an OS build. The specific drivers for a client device are automatically learned from a device tree of the client device stored in a database or repository. This is done at build time of the OS, not during run time like some conventional approaches. The "device tree" is an existing description of the hardware residing on the client device, describing the properties/configuration of the hardware itself. In particular, the device tree specifies a compatibility string for each piece of hardware, specifying what driver the hardware is compatible with. Other embodiments utilize the device tree solely on the build machine, without ever having to go to the client device.

Once learned from the device tree, the compatibility string is used to determine which driver to reference in a driver binding for a particular piece of hardware of the client device, and then a driver binding is automatically generated based on the identified driver. For example, a device tree may specify compatibility string "abc,company, UART3620" for a specific universal asynchronous receiver transceiver (UART) manufactured by the fictitious ABC company. Embodiments identify the specific type of UART of the client device using the compatibility string abc, company,UART3620 in the device tree, and use the compatibility string to locate corresponding driver code for the identified hardware in a driver model that includes source code for a collection of different drivers. The driver code for the identified hardware is used to create the driver binding and properly instantiate the driver in the OS build in order to create the image of the OS build for the client device.

The driver bindings that are automatically generated by the disclosed embodiments are concrete implementations with symbol names that a linker program can connect to the hardware-independent OS code. Doing so allows many candidate drivers to be present in the same linked libraries as object file symbol names do not conflict. Also, the OS is able to use the specific names, processes, types, and routines of the hardware drivers. In this vein, embodiments automatically generate driver class instances for the OS build, passing selected configuration data in the device tree to class constructors. In some examples, these constructors are "constexpr" C++ constructors that allow for compile-time object construction that is very device memory-efficient.

The disclosed embodiments and examples save a substantial amount of developer time and memory resources. OS developers no longer have to painstakingly spell out all of the different driver configurations that are either on or anticipated to be used by client devices. Nor does the OS build need to include lengthy lists of driver configurations, which cuts down the amount of memory needed, making the disclosed embodiments well suited for embedded system devices. Instead, device-specific images of the OS are prepared that include the exact drivers for the hardware of the client device, providing an automated way to generate smaller OS images for embedded systems that have limited memory. Also, the disclosed examples save valuable time for OS developers who likely do not know all of the drivers that are included on a new client device—let alone all of the driver configurations. Also, different entities are able to author the OS and the drivers/device tree. For example, a software company may author the OS and a hardware vendor may author the device drivers and device trees for their devices.

For the sake of clarity, the disclosed embodiments and examples are discussed herein in reference to a cloud environment, which may be a third-party operated cloud-computing network, an on-premises IT network of an organization, a combination thereof, or the like. The terms "cloud environment" and "cloud-computing environment," as referenced herein include third-party cloud environments, on-premises IT networks, and any other remote server networks.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 illustrates an example of a client device configured to receive an OS build with hardware driver bindings and instances for resident hardware components in accordance with some of the embodiments disclosed herein. Client device 100 includes one or more processing units 102, input/output (I/O) ports 104, a communications interface 106, computer-storage memory (memory) 108, hardware components 110, and a communications path 112—all of which constitute hardware components with drivers and presence in one or more device trees.

Client device 100 may take the form any number of computing devices 100, such as laptops, smartphones, tablets, VR headsets, wearables, embedded systems, or the like. In specific embodiments, as indicated by the electronic chip in FIG. 1, client device 100 is an embedded system, such as, for example but without limitation, a smart sensor, IoT device, application-specific integrated circuit (ASIC), or other device that engineered and programmed for a specific functional purpose. Client device 100 is but one example of a suitable computing environment and is not intended to suggest any limitation as to the scope of use or functionality of the disclosed embodiments.

The processing unit 102 may include any type of ASIC, System on Chip (SoC), microcontroller, controller, microprocessor, analog circuit, or the like for that are programmed to execute computer-executable instructions for implementing aspects of this disclosure. In some examples, the processing unit 102 is programmed to execute instructions such as those illustrated in the other drawings discussed herein. For purposes of this disclosure, the terms "processor," "controller," "processing unit," and "control unit" are meant to connote the same thing and are used interchangeably.

Client device 100 is equipped with one or more hardware components 110. Hardware components 110 refer to the specific hardware that is connected to or resident on client device 100. Examples of hardware components 110 include, without limitation, transceivers (e.g., UART); displays (e.g., touch, VR or augmented reality (AR), etc.); peripherals (e.g., stylus, wearable, etc.); sensors (e.g., accelerometer, inertial movement unit (IMU), gyroscope, global positioning system (GPS), magnetometer, etc.); microphones; speakers; or any other hardware. Any combination of hardware may be incorporated in client device 100.

Hardware components 114 are configured to operate according to specific hardware drivers (HW drivers) 114. HW drivers 114 represent the specific software and firmware instructions for operating the hardware components 110. In some embodiments, source code of HW drivers 114 is provided to or made available to OS developers. This source code may be uploaded to a code repository, as discussed in more detail in reference to FIG. 2.

As previously discussed, a device tree 116 is created for client device 100. Device tree 116 specifies the hardware components 110 resident on client device 100 and, specifically, a compatibility string indicating HW drivers 114 for use in operating hardware components 110. For example, a particular UART hardware component 110 may have a device tree that specifies the specific type of UART, serial port it provides, registers it uses, clocks it uses, and a compatibility string. The compatibility string provides a list of compatible names that is, in some embodiments, intended to be of decreasing specificity. For example, a device tree compatible list might include "mediatek,uart-mt3620," "mediatek,uart," and "generic-uart," which allows OSes to find the most specific driver they have for that hardware. If the OS does not have a driver for any of those names, the OS is not compatible for the hardware.

This type of information may be included for every one of the hardware components 110 in device tree 116, so, for instance, a display, sensor, etc. As discussed in more detail below, design tree 116 is used by an OS build service to automatically generate the specific code to tailor an OS build to the client device 100 by using the specific calls, names, types, routines, and other software or firmware of the HW drivers 114.

While some embodiments use the device tree 116, other embodiments use different formats that describe the hardware of a system or computing device. For the sake of clarity, embodiments reference use of a device tree 116, but other lists of hardware may be alternatively used and are fully contemplated in the discussions herein of device trees.

In some embodiments, the manufacturer of client device 100 creates device tree 116. Alternatively, third parties may generate the device tree 116. Device tree 116 may be privately or publicly shared with an OS developer. For instance, OS developers working on a build of the WINDOWS® OS provided by the MICROSOFT CORPORATION® headquartered in Redmond, Wash., may receive device trees 116 for myriad client devices 100 to tailor different builds of WINDOWS® therefor.

I/O ports 104 provider internal and external connections for the hardware components 110. Hardware components 110 use the I/O ports 104 to operate externally and internally.

Communications interface 106 allows software and data to be transferred between client device 100 and external devices over a network 140. Examples of communications interface 106 may include a modem, a network interface (such as an Ethernet card), a communications port, a Personal Computer Memory Card International Association (PCMCIA) slot and card, a BLUETOOTH® transceiver, radio frequency (RF) transceiver, a near-field communication (NFC) transmitter, or the like. Software and data transferred via the communications interface 106 are in the form of signals that may be electronic, electromagnetic, optical or other signals capable of being received by communications interface 106. Such signals are provided to the communications interface 106 via the communications path (e.g., channel) 112. This communications path 112 carries the signals and may be implemented using a wired, wireless, fiber optic, telephone, cellular, radio frequency RF, or other communication channel.

Network 140 may include any computer network or combination thereof. Examples of computer networks configurable to operate as network 140 include, without limitation, a wireless network; landline; cable line; digital subscriber line (DSL): fiber-optic line; cellular network (e.g., 3G, 4G, 5G, etc.); local area network (LAN); wide area network (WAN), metropolitan area network (MAN); or the like. The network 140 is not limited, however, to connections coupling separate computer units. Rather, the network 140 may also comprise subsystems that transfer data between servers or computing devices. For example, the network 140 may also include a point-to-point connection, the Internet, an Ethernet, an electrical bus, a neural network, or other internal system. Such networking architectures are well known and need not be discussed at depth herein.

Computer-storage memory 108 includes any quantity of memory devices associated with or accessible by the client device 100. The computer-storage memory 108 may take the form of the computer-storage media references below and operatively provide storage of computer-readable instructions, data structures, program modules and other data for the client device 100 to store and access instructions configured to carry out the various operations disclosed herein. The computer-storage memory 108 may include memory devices in the form of volatile and/or nonvolatile memory, removable or non-removable memory, data disks in virtual environments, or a combination thereof. And computer-storage memory 108 may include any quantity of memory associated with or accessible by the client device 100. Examples of client device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory.

The computer-storage memory 108 may be internal to the client device 100 (as shown in FIG. 1), external to the client device 100 (not shown), or both (not shown). Additionally or alternatively, the computer-storage memory 108 may be distributed across multiple client devices 100 and/or servers, e.g., in a virtualized environment providing distributed processing. For the purposes of this disclosure, "computer storage media," "computer-storage memory," "memory," and "memory devices" are synonymous terms for the computer-storage media 108, and none of these terms include carrier waves or propagating signaling.

In some examples, the computer-storage memory 108 stores executable computer instructions for an operating system (OS) image 118 and various software applications 120. The OS image 116 may be any OS designed to control the functionality of client device 100, including, for example but without limitation: WINDOWS® developed by the MICROSOFT CORPORATION® of Redmond, Wash.; MAC OS® developed by APPLE, INC.® of Cupertino, Calif.; ANDROID™ developed by GOOGLE, INC.® of Mountain View, Calif.; open-source LINUX®; or the like. In some embodiments, the OS image 118 is of an embedded OS for running on an embedded system. Embedded OSes are typically designed to be resource-efficient, including functions that only operate on RAM or ROM of client device 100, which may be the only resident memory 108 onboard. In such embodiments, the embedded system OS may be a real-time OS (RTOS).

In some embodiments, the OS image 118 is specifically tailored for the client device 100 though the building and linking operations discussed below. Once built, the OS image 118 includes various hardware-independent code 122 and hardware-specific code 124. The hardware-independent code 122 comprises instructions or portions of the corresponding OS that are coded the same way regardless of the hardware components 110 of client devices 100. For example, hardware-independent operations 122 may include different ways to open objects, queue different operations, package data transmissions, or any other operation that does not vary—at least in code—by the particular hardware components 110. On the other hand, the hardware-specific code 122 comprises different code (e.g., types, names, functions, configurations) depending on the hardware components 110 that are present. In other words, the hardware-specific operations 124 change from image to the image of the OS based on the driver information of the HW drivers 114, e.g., clocks, registers, compatibility strings, ports, etc.

In some embodiments, the hardware-specific code 124 is coded according to the HW drivers 114 of the hardware components 114. This coding of the hardware-specific code 124 changes in different OS images 118 residing on client devices 100 of different hardware configurations. For example, a display form ABC company may have a different HW driver 114 with different variables, routines, configurations, etc. than a display from XYZ company. So the hardware-specific code 124 may include different code for controlling the XYZ display according to its HW driver 114 than the code used for controlling the ABC display according to its HW driver 114.

In this vein, the OS image 118 includes various driver bindings 126 and driver instances 128 that are specifically coded according to the HW drivers 114. As discussed in more detail below, source code of the HW drivers 114 is analyzed to obtain the specific coding parameters (e.g., variables, functions, configurations, operations, routines, etc.) used by the HW drivers 114, driver bindings 126 with the obtained specific coding is generated and instantiated (driver instances 128) during a build of the OS. Then, an image of that driver-specific build of the OS is generated, creating the OS image 118 that is eventually downloaded to client device 100.

Figure 2:
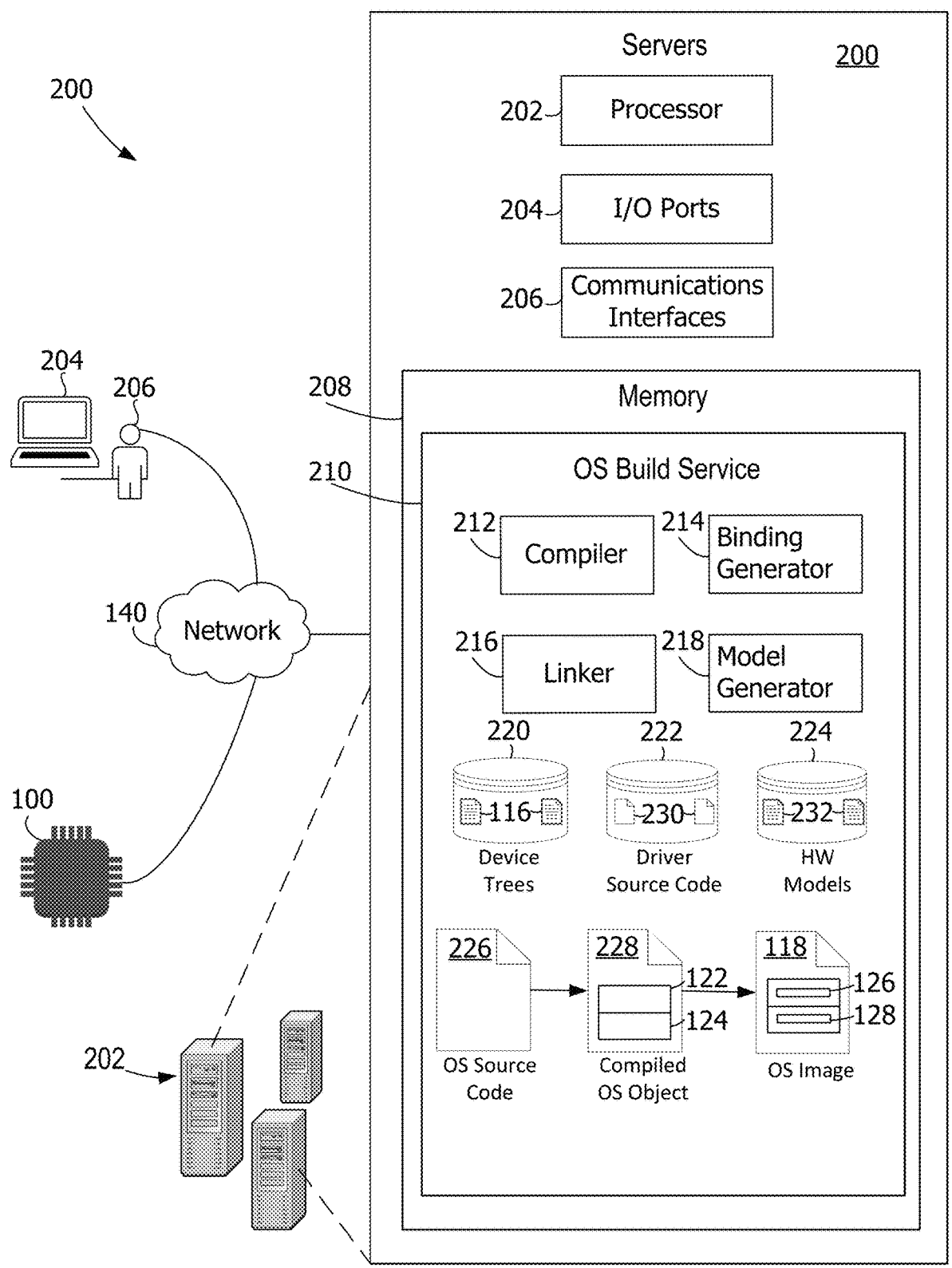
FIG. 2 is a block diagram of a networking environment for generating an OS image with hardware-specific code for particular hardware components of a client device, according to some of the disclosed embodiments.

FIG. 2 is a block diagram of a networking environment 200 for generating the OS image 118 with the hardware-specific code 124 for the hardware components 110 of the client device 110, according to some of the disclosed embodiments. Networking environment 200 involves the client device 100 for receiving the OS image 118, one or more servers 202, and computer 204 being used by a developer 206 of the OS, all of which are connected to the network 140. Computer 204 may be a PC, laptop, or other computer that the developer 206 uses to build the OS image 118 for the client device 100 using the disclosed services in a cloud environment being hosted by servers 202.

The servers 202 may be any type of server or remote computing device, either as a dedicated, relational, virtual, private, public, hybrid, or other cloud-based node. The servers include or have access to one or more processors 202, communications interfaces 208, and computer-storage memory 208, similar to the same-labeled components in FIG. 1. Specifically, the servers 202 include or have access to various processors 204, I/O ports 204, a communications interface 206, computer-storage memory 208, I/O components 210, and a communications path 212. The processors 204 supports server an OS that underlies the execution of software, applications, and computer programs thereon. In one instance, the computing unit is configured with tangible hardware elements, or machines, that are integral, or operably coupled, to the servers 201a,b to enable each device to perform a variety of processes and operations. The I/O ports 204, communications interface 206, computer-storage memory 208, I/O components 210, and communications path 212 may operate in the same manner as the similarly referenced components of FIG. 1. Server topologies and processing resources are generally well known to those in the art, and need not be discussed at length herein, other than to say that any server configuration may be used to execute the OS component server discussed below.

An operating system build (OS build) service 210 is stored in the memory 208 of the servers 202 and executable by the processors 204. The OS build service 210 may be implemented partly or wholly as software code or through firmware. In particular, the OS build service 210 includes executable code instructions for a compiler 212, a binding generator 214, a linker 216, and a HW model generator 218. Additionally, the OS build service 210 includes or has access to a device trees database 220, a hardware driver source code (driver source code) database 222, and a hardware model (HW model) database 224.

The device trees database 220 stores various device trees 116 for numerous client devices 100. As referenced above, the device trees 116 specify the hardware components 110 on the various client devices 100. Device trees 116 are specific to individual client devices 100. For instance, an IoT device manufactured by ABC company has a different device tree 116 than a tablet manufactured by XYZ company. In some embodiments, the device trees 116 in the device trees database 220 are generated and shared as open-source code—e.g., through LINUX®. Alternatively, the device trees 116 are provided privately to an OS manufacturer (i.e., the company releasing an OS), which stores the device trees 116 securely. For example, numerous companies that manufacture computers and embedded systems may share device trees 116 with the MICROSOFT CORPORATION® that offers the WINDOWS® OS. In operation, each device tree 116 defines a compatibility string that references a name assigned to the HW driver 114 for a particular hardware component 110.

The driver source code 222 database stores source code of the various HW drivers 114 (HW driver source code 230). This HW driver source code 230 may be created and provided by the manufacturer of the hardware components 110. For example, a display manufacturer provides the appropriate HW driver 114 for its display, either publicly or privately to the OS manufacturer. In particular, the HW driver source code 230 includes the exact types, variables, names, routines, operations, and hardware configurations that the HW drivers 114 use to control their respective hardware components 110. The HW driver source code 230 is one of the HW drivers 114 used to run the hardware components 110.

Figure 5A:
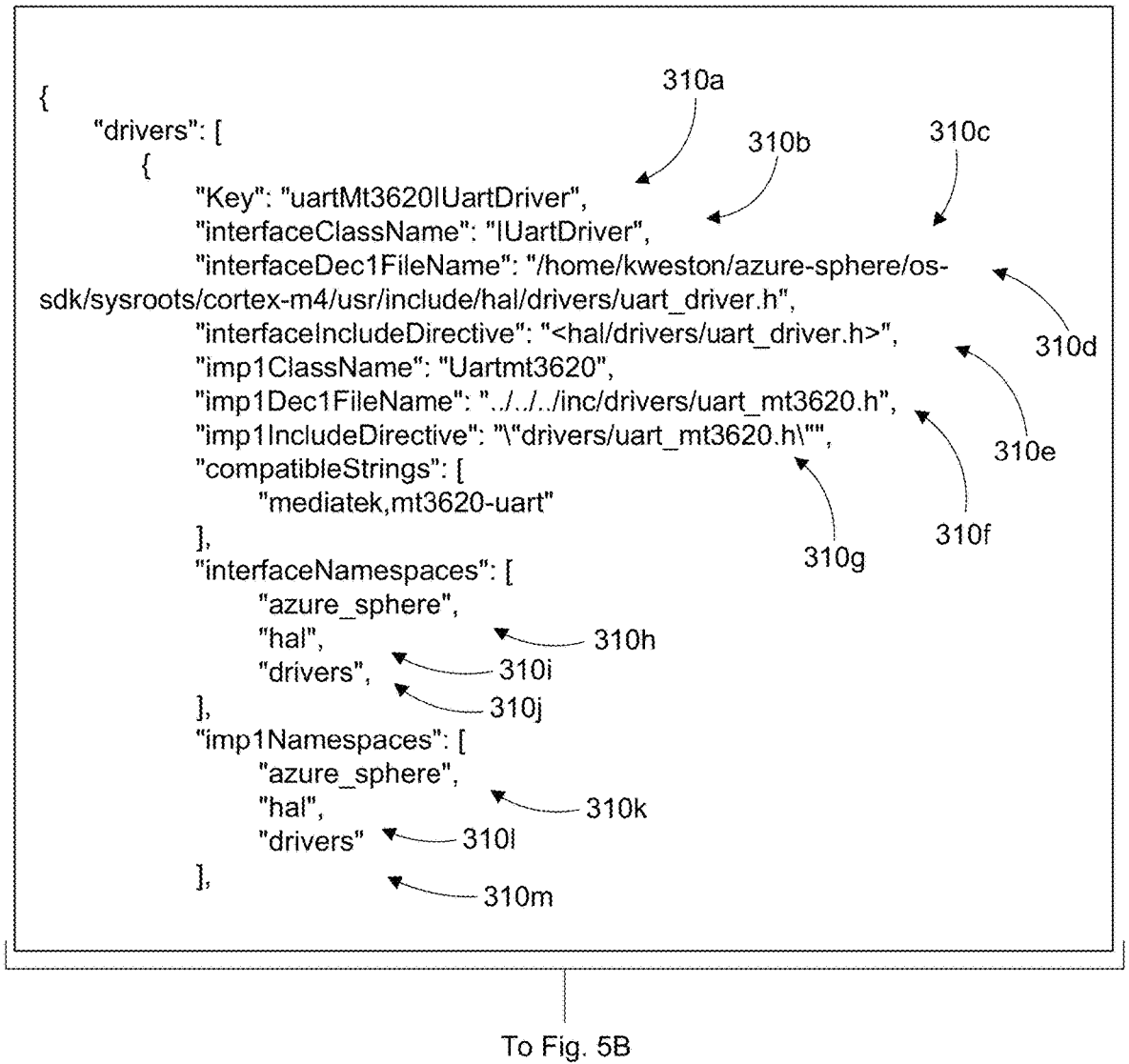

The HW models database 224 stores driver models 232 for the various HW drivers 114 in all, a subset, or at least one of the hardware components 110 of the client devices 100 through analysis of the device trees 116 and the driver source code 230. An example of a driver model 232 is shown in FIGS. 5A-5B below. For each client device 100, the model generator 218 analyzes its device tree 116 to identify the compatibility string of the HW driver 114. The compatibility string 302 is searched for in the driver source code 230 to identify where the specific HW driver 114 code is located. The model generator 218 analyzes the driver source code 230 where the compatibility string 302 is found, parsing out (or identifying) the specific class 206, variable name 208, and driver configuration parameters 310 and generates the driver model 232 for that HW driver 114 from the driver source code 230. In some embodiments, the driver model 232 includes the compatibility string, the type of driver (e.g., a UART driver, display, etc.), the specific name assigned to the HW driver 114 in the driver source code 230, and various driver parameters specific to the driver (e.g., operands the HW driver 114 driver requires). In some embodiments, the driver model 232 is stored as a TXT file.

The model generator 218 applies various heuristics, via code, to parse the driver source code 230 of a HW driver 114 for the driver model 232. One particular heuristic-based code is the open-source code LIBCLANG. Other heuristic-based algorithms may be applied that identify the specific variables, operations, operands, functions, types, routines, and other code parts that are included in the driver models 232.

The OS build service 210 uses the compiler 212, binding generator 214, and linker 216 to take source code of an OS (the OS source code 226) and create the OS image 118 that is specifically tailored for the client device 100. To do so, the compiler 212 compiles the OS source code 226 into a compiled OS object 228. The compiled OS object 228 includes the previously discussed hardware-independent code 124. The linker 216 integrates a hardware-independent compiled OS object and a hardware-specific compiled object to produce the OS image 118. These driver-specific operations and variables constitute external interfaces that are to be linked with the different hardware components 110 of the client device 100. The linker 212 automatically identifies these external interfaces, and the binding generator 214 creates the driver bindings 126 and driver instances 128 that link the compiled OS object 228 to the hardware components 114 of the client device 100.

The OS build service 208 allows the OS developer 206 to create the OS image 118 with the driver bindings 126 and the driver instances 128 from a build of the OS, referenced as the OS source code 226. The compiler 212 compiles the OS source code 226 into a compiled OS object 228 that includes the previously discussed hardware-independent code 124 and the hardware-specific code 122. The OS compiled object 228 is then analyzed by the linker 216 to identify where the driver bindings 126 are needed.

The binding generator 214 analyzes the device tree 116 to identify the various hardware components 110 of the client device 100. For each hardware component 110, the binding generator 214, the binding generator identifies or locates a compatibility string that specifies the name of the HW driver 114 given by the driver's developer. In some embodiments, the binding generator 214 searches for the compatibility string in the HW driver source code 230 of the driver source code database 222.

As mentioned above, traditional OS source code calls a well-known function name but that function is not provided by the OS so the OS compiled object will not contain a symbol with that name. The binding generator 214 creates a function with that well-known name that invokes the corresponding function on the driver instance. The hardware-specific compiled object then contains the well-known symbol name. The linker 216 may then make the connection between the two compiled objects when producing the OS image.

Additionally or alternatively, the binding generator 214 may search for the compatibility string in the HW models 232 of the HW model database 224. Embodiments may use either the HW driver source code 230 or the driver models 232 to generate the driver bindings 122 and driver instances 124. If the compatibility string is not found in either the HW driver source code 230 or the driver models 232, an error is be returned. If the compatibility string is found, the binding generator 214 automatically generates the driver binding 122 and the driver instances 124 from the driver source code 230 with the specific compatibility string.

Figure 3:
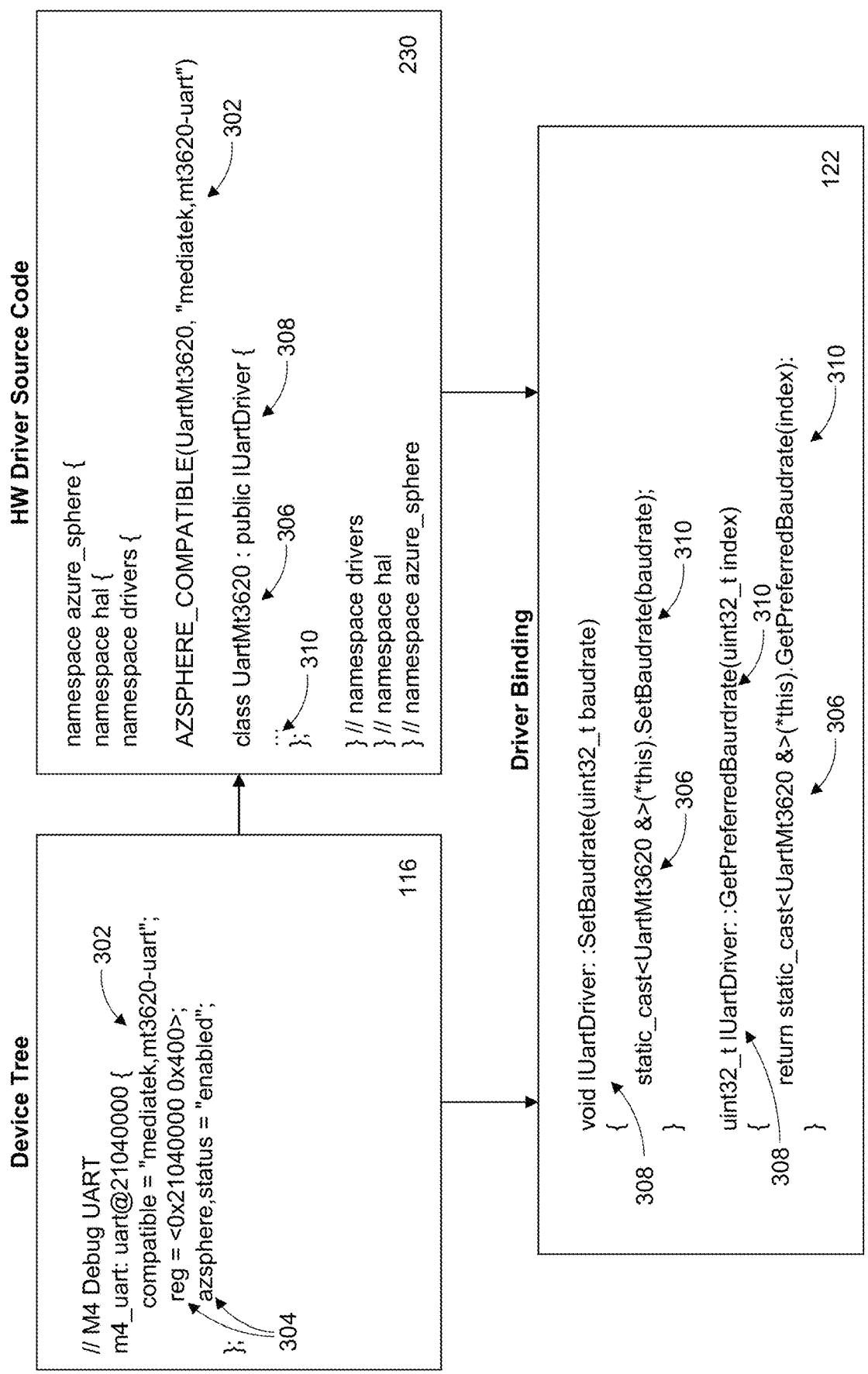
FIG. 3 illustrates user interface (UI) diagrams of a driver binding being generated from hardware source code and a device tree of a client device, according to some of the disclosed embodiments.

FIG. 3 illustrates UI diagrams of a driver binding 122 being generated from HW driver source code 230 and a device tree 116 of a client device 100, according to some of the disclosed embodiments. The illustrated example shows the driver 124 being generated for a particular UART of the client device 100 manufactured by MEDIATEK® with a product identifier of UART MT3620 M4. Only one driver binding 124 is shown, but the disclosed embodiments generate driver bindings 124 for all, or at some, of the hardware components 110 of the client device 100.

In operation, the binding generator 214 analyzes the device tree 116 to locate and identify a compatibility string 302 that has been specifically assigned to the UART hardware component 110, either by the manufacturer (e.g., MEDIATEK®) or a third party that developed the corresponding HW driver 114. In the depicted example, the compatibility string 302 was given the name "mediatek, mt3620-uart." The device tree 116 also specifies various driver configurations 304, such as the particular register being used, clock parameters, version compatibility, whether the hardware component 110 is enabled or not in an OS, or other configurations.

The binding generator 214 searches for the compatibility string 302 in the HW driver source code 230 to identify the relevant code of the HW driver 114 for the UART hardware component 110. Once the compatibility string 302 is located in the driver source code 222, the binding generator 214 identifies the specific function calls, variables, names, and configurations specified for the UART hardware component 110 in the HW driver source code 230. In the depicted example, the hardware type 302 is identified as an M4 UART, and a compatibility string 306 provides the name, mediatek,mt3620-uart, used to search the driver source code 230 for the correct HW driver 114 of the UART hardware component 110. The illustrated HW driver source code 230 shows the HW driver 114 found in the driver source code database 222 with the compatibility string 302. This driver source code 230 is then analyzed by the binding generator 214 and used to automatically build the driver binding 122.

The binding generator 214 automatically generates the driver binding 122 using the HW driver source code 230. In some examples, the HW driver source code 230 for the UART hardware component 110 includes a class 306 and variable name 308 that are used, or expected, by the HW driver source code 230. Additional driver configuration parameters 310 may be specified as well. Though not shown, additional driver configuration parameters 310 may include specific functions for setting and baud rates. These driver configuration parameters 310 may be taken from the HW driver source code 230 or HW models 232 that are built therefrom. An example driver model 232 is shown in FIGS. 5A-5B. As shown, the same class 306 and variable name 308 from the HW driver source code 230 are populated in the driver binding 122, and different function calls are created for the driver configuration parameters 310, setting and getting preferred baud rates. Thus, the driver binding 322 is generated through analyzing the device tree 116 for the compatibility string 302, using the compatibility string 302 to identify the correct HW driver source code 230, and creating the driver being 322 using the HW driver source code 230.

FIG. 4 illustrates UI diagrams of a driver instance 124 being generated from HW driver source code 230 and a device tree 116 of a client device 100, according to some of the disclosed embodiments. The binding generator 214 starts with a list of drivers that need to be located in the device tree 116. In the depicted example, "chosen/azsphere,debug-uart" is in that list. For each driver, the binding generator 214 follows a pointer (phandle in device tree 116) to the specific hardware node (m4_uart). The binding generator 214 uses the compatible property of that node to locate the appropriate driver model (or source code if not using a model). The binding generator 214 reads from the HW model 232 a description of the parameters required by the driver class' constructor (310r-w). For each required parameter, the binding generator 214 looks for a suitable value in the device tree. A relative or absolute location in the device tree may be specified by the driver author (see the AZSPHERE_CON-STRUCTOR_ARG_DT_SOURCE macro in FIG. 4). If no parameter path is supplied, the binding generator 214 looks for a property with the same name as the parameter on the device tree 116 node for this hardware device. In FIG. 4, the xtal_frequency parameter has been given a specified relative search path (follow the 'clocks' property to a different node and use the 'clock_frequency' property found there). The 'reg' parameter, in contrast, has no specific path supplied so it is filled in with the value of the 'reg' property of the uart@21040000 node.

When a suitable parameter value is found in the device tree 116, the binding generator 214 creates a variable or constant to store the value (e.g. the uart_21040000_xtal_frequency variable in the bottom frame of FIG. 4). Once all parameters have had their values stored in generated variables or constants, the binding generator 214 emits a call to the driver class constructor, passing those variables or constants (e.g. second to last line in FIG. 4). This, in turn, creates an instance of the HW driver. In this embodiment, the driver instance is passed to another constexpr class constructor (last line).

FIGS. 5A-5B illustrate an example driver model 232 built from HW driver source code 230, according to some of the disclosed embodiments. The driver model 232, which is generated by the model generator 218, includes various driver configuration parameters 310a-w. In some embodiments, the driver configuration parameters 310a-w are parsed from the HW driver source code 230, identified by the compatibility string 302 in the device tree 116 of the client device 100. The driver model 230 may be stored as a text file (.TXT) file that may be searched or tagged to identify the various driver configuration parameters 310a-w. Once generated, the binding generator 214 may use the driver model 232 in the generation of the driver bindings 122 and/or driver instances 124.

Again, the model generator 218 applies various heuristics, via code, to parse the driver source code 230 of the HW driver 114 to create the driver model 232. One particular heuristic-based code is open source LIBCLANG. Other heuristic-based algorithms may be applied that identify the configuration parameters 310a-w for the driver model 232.

Figure 6:
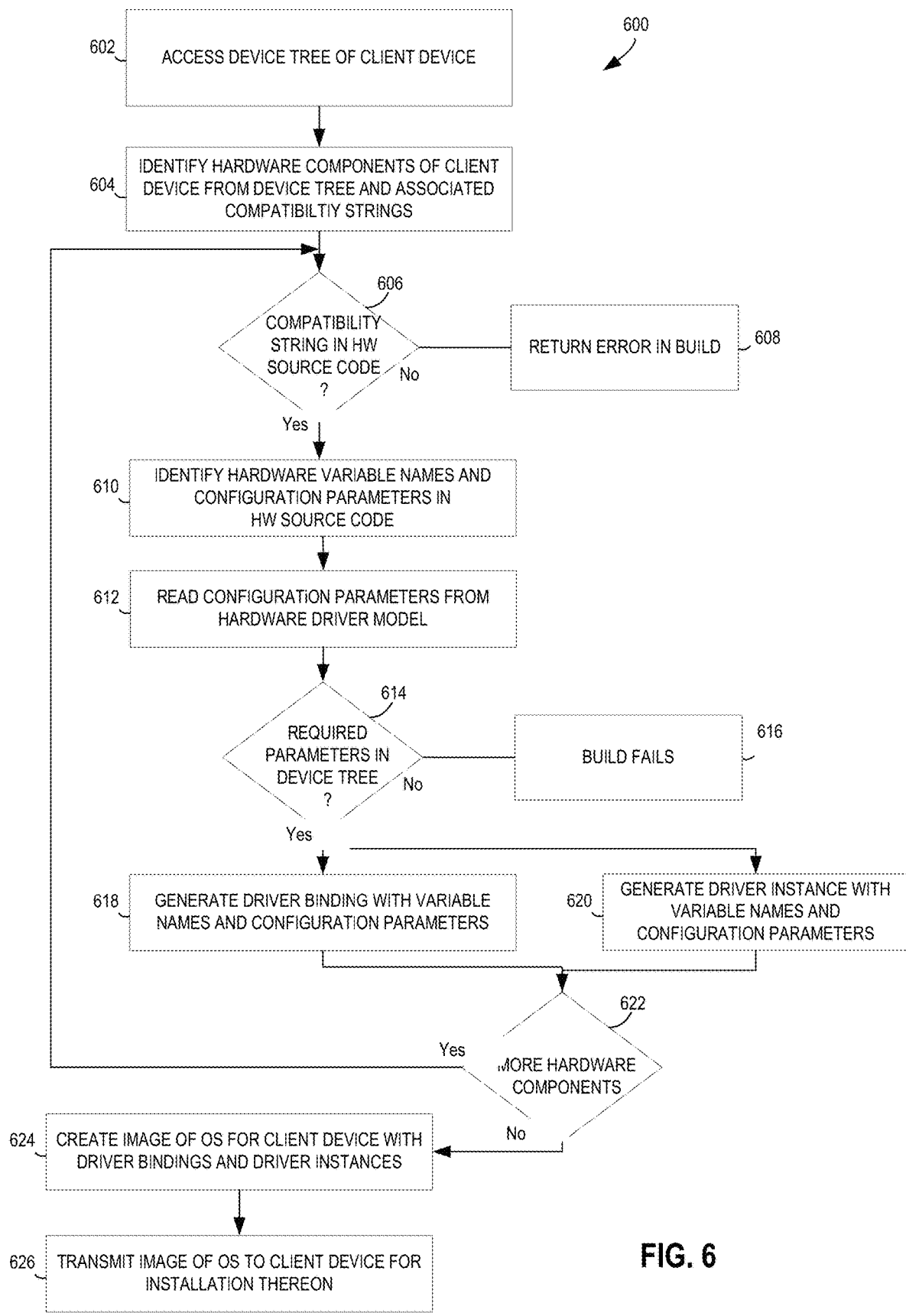
FIG. 6 illustrates flowchart diagrams showing a computer-executed workflow for generating an image of an OS that is specifically tailored for the hardware of a client device, according to some of the disclosed embodiments.

FIG. 6 illustrates a flowchart diagram showing a computer-executed workflow 600 for generating an image of an OS that is specifically tailored for the hardware of a client device, according to some of the disclosed embodiments. As shown at 602, a device tree of the client device is accessed. From the device tree, the hardware of the client device is identified as well as the compatibility strings for each hardware component, as shown at 604. A repository or database of hardware source code is then searched to see if the compatibility strings of the hardware components are found, as shown at 606. If not, an error in the build process of the specific image of the OS is returned, as shown at 608. Such an error may be provided to an OS developer.

On the other hand, if the compatibility string of a first hardware component is found in the hardware source code, various hardware variable names and configuration parameters are identified in the hardware source code, as shown at 610. Configuration parameters are read from the hardware driver model of the first hardware component, as shown at 612. The device tree for the first hardware component is checked to see whether the required parameters are specified, as shown at 614. If the required parameters are not present, the build fails, as shown at 616. If the required parameters are present, driver bindings and driver instances may then be generated using the identified variable names and configuration parameters, as shown at 618 and 620. This sequence is repeated for each of the hardware components in the device tree, as shown at decision box 622.

After all of the hardware components have been bound and instantiated, the image of the OS for the client device is created, as shown at 624. This image of the OS includes the driver bindings and driver instances generated through the disclosed techniques. And the image of the OS may then be transmitted to the client device for installation thereon, as shown at 626.

Figure 7:
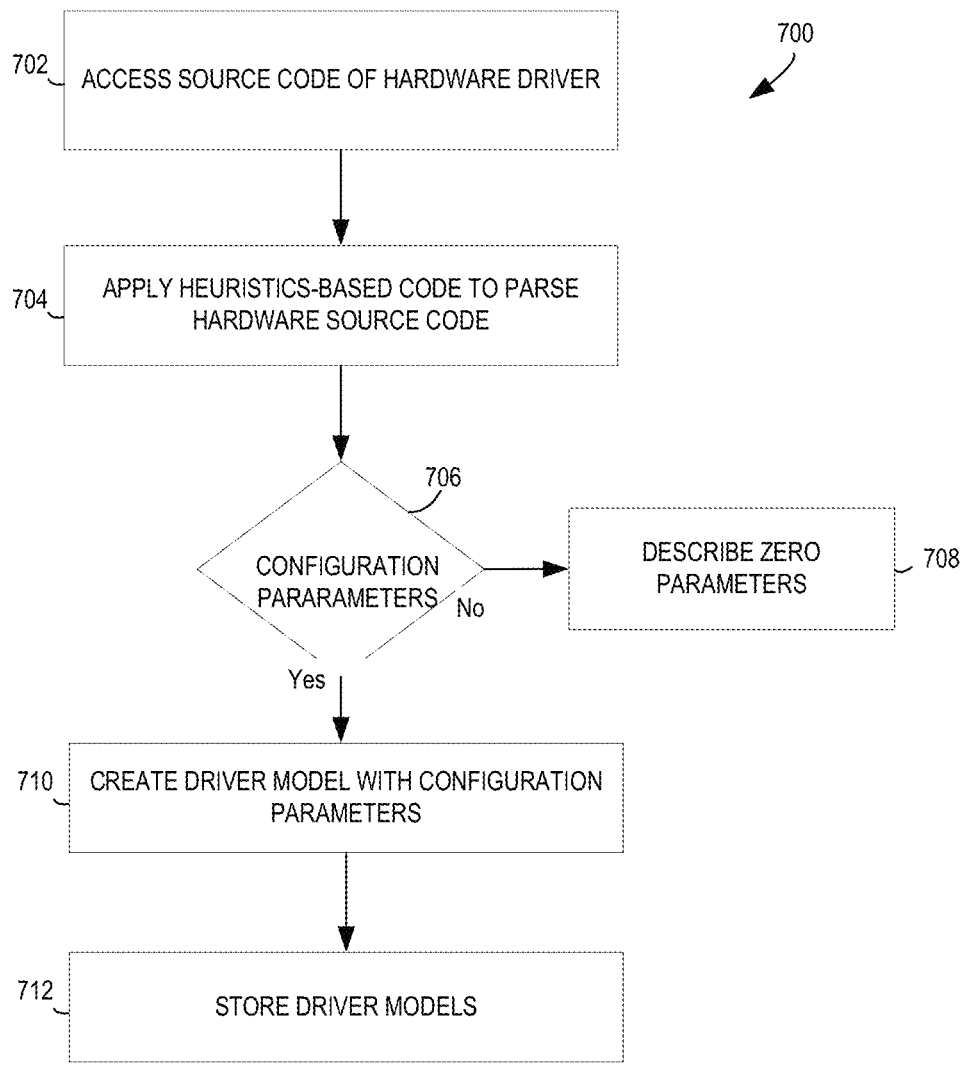
FIG. 7 illustrates a flowchart diagram showing a computer-executed workflow for generating a driver model, according to some of the disclosed embodiments.

FIG. 7 illustrates a flowchart diagram showing a computer-executed workflow 700 for generating a driver model, according to some of the disclosed embodiments. As shown at 702, the hardware source code for a hardware driver is accessed. Heuristics-based code (e.g., LIBCLANG) is used to parse the different parts of the hardware source code, identifying which ones are variables, operations, functions, and configuration parameters, as shown at 704. If no configuration parameters for the hardware (e.g., 310a-w in FIGS. 5A-5B), zero parameters are described, as shown at 708. But if configuration parameters are located, the configuration parameters are used to create a driver model for the specific hardware component, as shown at 710. This driver model may then be stored in a HW models database, as shown at 712.

Additional Examples

Some examples are directed to a method for automatically building driver bindings for hardware components to include in an OS for a client device. The method includes: accessing a device tree for the client device; identifying one or more hardware components of the client device from the device tree; for a first hardware component, locating a first compatibility string in the device tree; identifying first hardware driver source code for the first hardware component using the first compatibility string, the first hardware driver source code comprising one or more variable names and configuration parameters for a first hardware driver associated with the first hardware component; automatically generating a first driver binding based on the first hardware driver source code, wherein the first driver binding includes the one or more variable names and configuration parameters in the first hardware driver source code; and generating an image of the OS comprising the first driver binding for supply to the client device.

In some embodiments, the first compatibility string is set by a manufacturer of the client device.

Some embodiments additionally include identifying the one or more hardware components of the client device from the device tree; for a second hardware component of the one or more hardware components, locating a second compatibility string in the device tree; identifying other hardware driver source code for the second hardware component using the first compatibility string, the other hardware driver source code comprising a variable name for a second hardware driver associated with the second hardware component; automatically generating a second driver binding based on the other hardware driver source code, wherein the second driver binding includes the variable name in the second hardware driver source code; and adding the second driver binding to the image of the OS.

Some embodiments also include transmitting the image of the OS to the client device.

Some embodiments also include: identifying driver configuration parameters of at least one of the one or more hardware components from the first hardware driver source code; generating a driver instance based on the first driver binding, the driver instance comprising the driver configuration parameters; and adding the driver instance to the image of the OS.

Some embodiments also include adding the driver instance to the image of the OS.

In some embodiments, the first driver binding is generated after compilation of the OS.

In some embodiments, the first driver binding is generated without user intervention.

In some embodiments, the first driver binding is generated by one or more VMs in a cloud environment.

Some embodiments also include installing the image of the OS comprising the first driver binding on at least one of an ASIC, a microcontroller, a microprocessor, or an analog circuit on the client device.

Some embodiments also include executing a heuristic-based model on the first hardware driver source code to create a driver model.

In some embodiments, the heuristic-based model may be open-source code LIBCLANG.

Other embodiments are directed to a system configured for automatically building an OS specifically for a client device. The system includes: computer memory embodied with one or more databases storing a plurality of hardware driver source code and device trees; and one or more processors programmed to: access a device tree for the client device, identify one or more hardware components of the client device from the device tree, for a first hardware component, locate a first compatibility string in the device tree, identify first hardware driver source code for the first hardware component using the first compatibility string, the first hardware driver source code comprising one or more variable names or function names for a first hardware driver associated with the first hardware component, automatically generate a first driver binding based on the hardware driver source code, wherein the first driver binding includes the one or more variable names or function names in the hardware driver source code; and generate an image of the OS comprising the first driver binding for supply to the client device.

In some embodiments, the one or more processors are further programmed to: identify the one or more hardware components of the client device from the device tree; for a second hardware component of the one or more hardware components, locate a second compatibility string in the device tree; identify other hardware driver source code for the second hardware component using the second compatibility string, the other hardware driver source code comprising a variable name for a second hardware driver associated with the second hardware component, automatically generate a second driver binding based on the second hardware driver source code, wherein the second driver binding includes the variable name in the second hardware driver source code; and add the second driver binding to an image of the OS.

Some embodiments also include transmitting the image of the OS to the client device.

Some embodiments also include installing the image of the OS on the client device, wherein the client device comprises an embedded system.

Some embodiments also include executing a heuristic-based model on the first hardware driver source code to create a driver model Other embodiments are directed to one or more computer-storage memory embodied with computer-executable instructions for building an image of an OS specific for the hardware of a client device. The memory comprising instructions for: accessing a device tree for the client device; identifying one or more hardware components of the client device from the device tree; for a first hardware component, locating a compatibility string in the device tree; identifying hardware driver source code for the first hardware component using the compatibility string, the hardware driver source code comprising one or more variable names for a hardware driver associated with the first hardware component; automatically generating a driver instance based on the hardware driver source code, wherein the driver binding includes the one or more variable names in the hardware driver source code; and generating the image of the OS comprising the driver instance.

Some embodiments also include instructions for transmitting the image of the OS to the client device for installation thereon.

In some embodiments, the compatibility string comprises a variable name assigned by a manufacturer of the first hardware component.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, embedded systems, IoT devices, mobile tablets, hand-held devices, consumer electronics, specialty computing devices, etc. The disclosed examples may also be practiced in distributed computing environments where tasks are performed by remote-processing devices that are linked through a communications network.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

While the aspects of the disclosure have been described in terms of various examples with their associated operations, a person skilled in the art would appreciate that a combination of operations from any number of different examples is also within scope of the aspects of the disclosure.

The order of execution and performance of the operations in examples of the disclosure illustrated and described herein are not essential and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for instructing a client device to automatically build driver bindings for hardware components to include in an operating system (OS) of the client device, the method comprising:
   providing the client device with a device tree, the device tree comprising one or more hardware components of the client device and a compatibility string;
   receiving a request from the client device for first hardware driver source code related to a first hardware component referenced in the device tree that has been identified by the client device from the compatibility string;
   identifying driver configuration parameters of the first hardware component from the device tree;
   generating a driver instance based on a first driver binding, the driver instance comprising the driver configuration parameters; and
   providing the first hardware driver source code to the client device incident to said request to allow the client device to generate an image of the OS comprising the first driver binding with the first hardware driver source code.

2. The method of claim 1, wherein the compatibility string is set by a manufacturer of the client device.

3. The method of claim 1, wherein the compatibility string comprises a type of embedded system.

4. The method of claim 3, wherein the type of embedded system comprises a transceiver.

5. The method of claim 1, further comprising directing a linker program to connect, via the OS, the first driver binding to the first hardware driver source code.

6. The method of claim 1, further comprising:
   identifying the one or more hardware components of the client device from the device tree;
   for a second hardware component of the one or more hardware components, locating a second compatibility string in the device tree;
   identifying other hardware driver source code for the second hardware component using the second compatibility string, the other hardware driver source code comprising a variable name for a second hardware driver associated with the second hardware component;

automatically generating a second driver binding based on the other hardware driver source code, wherein the second driver binding includes the variable name in the other hardware driver source code; and adding the second driver binding to the image of the OS.

7. The method of claim 1, further comprising transmitting the image of the OS to the client device.

8. The method of claim 1, further comprising adding the driver instance to the image of the OS.

9. The method of claim 1, further comprising installing the image of the OS comprising the first driver binding on at least one of an application-specific integrated circuit (ASIC), a microcontroller, a microprocessor, or an analog circuit on the client device.

10. The method of claim 1, further comprising executing a heuristic-based model on the first hardware driver source code to create a driver model.

11. The method of claim 10, wherein the heuristic-based model is or uses LIBCLANG.

12. A system configured for instructing a client device to automatically build driver bindings for hardware components to include in an operating system (OS) of the client device, the system comprising:
  computer memory embodied with one or more databases storing a plurality of hardware driver source code and device trees; and
  one or more processors programmed to:
    provide the client device with a device tree, the device tree comprising one or more hardware components of the client device and a compatibility string,
    receive a request from the client device for first hardware driver source code related to a first hardware component referenced in the device tree that has been identified by the client device from the compatibility string,
    identify driver configuration parameters of the first hardware component from the device tree,
    generate a driver instance based on a first driver binding, the driver instance comprising the driver configuration parameters, and
    provide the first hardware driver source code to the client device incident to said request to allow the client device to generate an image of the OS comprising the first driver binding with the first hardware driver source code.

13. The system of claim 12, wherein the one or more processors are further programmed to:
  identify the one or more hardware components of the client device from the device tree;
  for a second hardware component of the one or more hardware components, locate a second compatibility string in the device tree;
  identify second hardware driver source code for the second hardware component using the second compatibility string, the second hardware driver source code comprising a variable name for a second hardware driver associated with the second hardware component;
  automatically generate a second driver binding based on the second hardware driver source code, wherein the second driver binding includes the variable name in the second hardware driver source code; and
  add the second driver binding to the image of the OS.

14. The system of claim 12, further comprising transmitting the image of the OS to the client device.

15. The system of claim 14, further comprising installing the image of the OS on the client device, wherein the client device comprises an embedded system.

16. The system of claim 12, further comprising executing a heuristic-based model on the first hardware driver source code to create a driver model.

17. One or more computer-storage memory embodied with computer-executable instructions for building an image of an operating system (OS) specific for hardware of a client device, comprising:
  providing the client device with a device tree, the device tree comprising one or more hardware components of the client device and a compatibility string;
  receiving a request from the client device for first hardware driver source code related to a first hardware component referenced in the device tree that has been identified by the client device from the compatibility string;
  identifying, from the request, a first hardware component resident on the client device;
  identifying driver configuration parameters of the first hardware component from the device tree;
  generating a driver instance based on a first driver binding, the driver instance comprising the driver configuration parameters; and
  providing the first hardware driver source code to the client device incident to said request to allow the client device to generate an image of the OS comprising the first driver binding with the first hardware driver source code.

18. The one or more computer-storage memory of claim 17, further installing the image of the OS on the client device.

19. The one or more computer-storage memory of claim 17, further comprising executing a heuristic-based model on the first hardware driver source code to create a driver model.

20. The one or more computer-storage memory of claim 17, further comprising executing a heuristic model on one or more hardware databases to identify the first hardware driver source code.

* * * * *